United States Patent [19]
Lawson

[11] Patent Number: 4,865,289
[45] Date of Patent: Sep. 12, 1989

[54] HOLTLESS MOTOR MOUNTING ARRANGEMENT WITH SELF TIGHTENING OF DRIVE BELTS

[76] Inventor: John D. Lawson, R.R. #1, P.O. Box 83, Leesburg, Ind. 46538

[21] Appl. No.: 174,872

[22] Filed: Mar. 29, 1988

[51] Int. Cl.$^4$ .......................................... F16M 13/00
[52] U.S. Cl. ................................ 248/666; 248/220.2; 403/353; 474/114; 474/132
[58] Field of Search .............. 248/665, 666, 667, 21.2, 248/222.2, 220.2; 474/114, 115, 132; 403/353

[56] References Cited

U.S. PATENT DOCUMENTS

| | | | |
|---|---|---|---|
| 1,528,346 | 3/1925 | Stampen | 248/665 |
| 1,960506 | 5/1934 | Pfleger | 474/114 X |
| 2,367,601 | 1/1945 | Nicol | 248/666 X |
| 2,568,290 | 9/1951 | Mountain et al. | 474/114 X |
| 2,601,431 | 6/1952 | Christie | 248/665 |
| 2,628,047 | 2/1953 | Herder et al. | 474/114 X |
| 2,791,126 | 5/1957 | Christopher | 474/114 X |
| 2,911,700 | 11/1959 | Wieland | 248/665 X |
| 3,337,172 | 8/1967 | Jackson | 248/222.2 |
| 3,367,286 | 2/1968 | Jantzen | 248/222.2 X |
| 3,538,860 | 11/1970 | Fisher | 248/242 X |
| 4,340,144 | 7/1982 | Cousins | 211/87 |
| 4,504,253 | 3/1985 | Buschbom et al. | 474/114 |

FOREIGN PATENT DOCUMENTS 2640423 3/1977 Fed. Rep. of Germany ... 248/221.2

Primary Examiner—Alvin C. Chin-Shue
Assistant Examiner—David L. Talbott
Attorney, Agent, or Firm—Roger M. Rickert

[57] ABSTRACT

A motor mounting arrangement requiring no bolts or other fasteners is disclosed in the form of a pair of mounting plates hinged at one end to the device to be powered by the motor. Each plate has a hinge-like deformation at one plate end for encircling a pivot pin fixed to the device and two contilevered locking tabs having their respective free ends extending in opposite directions and displaced from the plate. The motor base includes a plate having elongated apertures whereby the motor plate and two plates may be juxtaposed with one tab of each mounting plate extending through corresponding motor plate apertures, the motor and plate laterally shifted relative to the mounting plates and the other tabs passed through the other apertures. The article of equipment to be powered by the motor or similar device may include a driven shaft and the motor may be coupled to the driven shaft by a flexible endless coupler, such as a belt or chain, entrained respectively about the driven shaft and a shaft of the motor with the motor pivotably supported so that the weight of the motor maintains the member taut.

6 Claims, 1 Drawing Sheet

HOLTLESS MOTOR MOUNTING ARRANGEMENT WITH SELF TIGHTENING OF DRIVE BELTS

SUMMARY OF THE INVENTION

The present invention relates generally to electric motor mounting schemes and more particularly to such a mounting scheme where no bolts or other fasteners and, therefore, no tools are required for affixing or removing the motor from a device driven by the motor. An added feature inherent in the inventive scheme is the automatic tensioning of drive belts, chains and similar coupling arrangements.

Fractional and smaller integral horsepower motors are typically manufactured with an integral mounting base in the form of a plate or platform welded or otherwise formed integral with the motor housing. This base ordinarily has four elongated holes spaced about the vertices of a rectangle for receiving mounting bolts or screws to fasten the motor to some utilization device. The holes are typically elongated in a direction perpendicular to the axis of the motor shaft to allow adaptation to and some transverse adjustment of the motor on any of a wide variety of devices. V-belt drives or chain drives, for example, are sometimes tightened by this transverse motion. The mounting bolts are sometimes damaged and frequently subject to corrosion or rust particularly when the motor is mounted in a hostile environment making removal for maintenance or replacement quite difficult. Damage to the driven unit can result when chisels or torches are used in attempting to remove these bolts. Even a task so simple as tightening a v-belt drive arrangement can become a time consuming and difficult project. Even when the integrity of the bolts has been maintained, one and more often two wrenches are required for replacement, repair or adjustment. Bolts, screws or other removable fasteners are also frequently lost during maintenance and the job interrupted until suitable replacements can be found.

It would be highly desirable to eliminate all removable fasteners and the need for any tools in a motor mounting scheme. Attempts to avoid the abovenoted problems have met with at best limited success. For example, the Stampen U.S. Pat. No. 1,528,346 teaches a motor mounted with the shaft vertical and free to swing in a vertical plane providing intentional slippage. The bracket requires a special vibration reducing tongue. Both the slippage and the vibration reducing tongue would be unacceptable in many applications as, for example, ventilation fans applications. In this patented arrangement, the motor tilts to provide belt tensioning not only causing the pulleys to be misaligned, but, due to the short lever arm length, this fails to provide adequate force to properly maintain belt tension. This patented arrangement is limited to vertical plane motor positions.

As another example, Herder et al U.S. Pat. No. 2,628,047 shows a motor mounting scheme which allows one motor to be shared by several machines by moving the motor from one machine to another. The motor is rotated about a flat mounting bracket to align the bracket edgewise with a slot in another bracket fixed to a machine. This rotation removes belt tension and allows the motor and attached bracket to be moved to another machine. This patented arrangement still requires bolts to fasten the motor to its specially tooled base.

Among the several objects of the present invention may be noted the provision of a system for mounting an electric motor on a device to be powered by the motor which requires no tools for mounting or removal; the provision of a motor mounting scheme having no removable fasteners; and the provision of a motor mounting device for an entrained endless coupling drive arrangement where tension on the coupling member is maintained by the weight of the motor and that tension in turn maintains the motor securely mounted. These as well as other objects and advantageous features of the present invention will be in part apparent and in part pointed out hereinafter.

In general, an arrangement for mounting a device such as an electric motor in driving relation with an article of equipment has first and second generally flat plates with the first plate fixed to the motor and the second plate supported near one end thereof by the article of equipment for pivotal motion about an axis. One of the plates is provided with at least two elongated apertures and the other of the plates has at least two corresponding cantilevered locking tabs with their respective free ends extending in opposite directions and displaced from the other plate whereby the two plates may be juxtaposed with one tab extending through one aperture, one plate laterally shifted relative to the other plate and the other tab passed through the other aperture. The article of equipment typically includes a driven shaft and the motor is coupled to the driven shaft by a flexible endless coupler, such as a belt or chain, entrained respectively about the driven shaft and a shaft of the motor with the motor being pivotably supported so that the weight of the motor maintains the coupling member taut.

Also in general and in one form of the invention, an arrangement for mounting a device such as an electric motor in driving relation with another device or article of equipment comprises a generally planar sheet of metal having a plurality of elongated apertures, a like plurality of mounting fingers formed from portions of a pair of like plates with the fingers extending obliquely relative to the plane of the sheet of metal and through corresponding elongated apertures, at least two fingers extending in directions opposite one another and having cantilevered free ends with the distance between the cantilevered free ends exceeding the maximum distance between their corresponding apertures.

Still further in general and in one form of the invention, a sheet metal plate is formed from a flat planar sheet of metal to be used as one of a pair of like plates for mounting an electric motor on a device supported pivot pin for powering the device. Each plate has a hinge-like deformation at one plate end for encircling the pivot pin and two cantilevered locking tabs having their respective free ends extending in opposite directions and displaced from the sheet of metal. The locking tabs are formed by partially severing the plate to outline the tabs and deforming the outlined tabs out of the plane of the plate. The device thus eliminates the need for tools or locking bolts.

BRIEF DESCRIPTION OF THE DRAWING

Corresponding reference characters indicate corresponding parts throughout the several views of the drawing.

Figure 1:
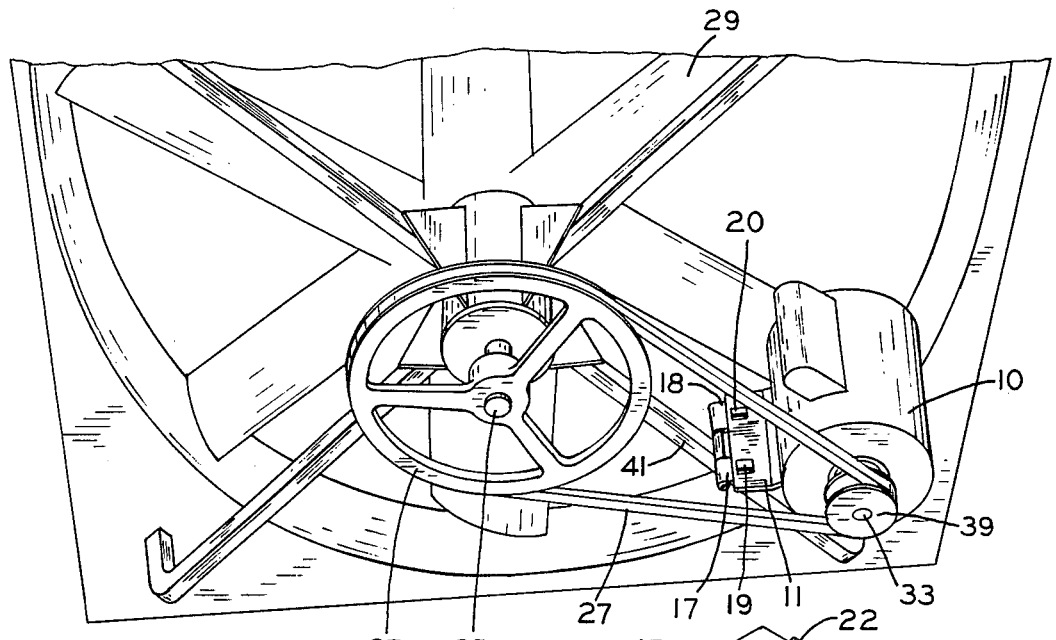
FIG. 1 is a perspective view of an electric motor mounted in accordance with the present invention in driving relation with an illustrative exhaust fan.

The exemplifications set out herein illustrate a preferred embodiment of the invention in one form thereof and such exemplifications are not to be construed as limiting the scope of the disclosure or the scope of the invention in any manner.

DESCRIPTION OF THE PREFERRED EMBODIMENT

Referring to the drawing generally, there is illustrated an arrangement for mounting a conventional electric motor 10 in a V-belt drive environment without any bolts, screws, removable pins or similar removable fasteners passing through the motor base 11. The weight of the motor 10 maintains belt tension while the belt tension in turn holds the motor in its locked position on a hinged base.

Figure 2:
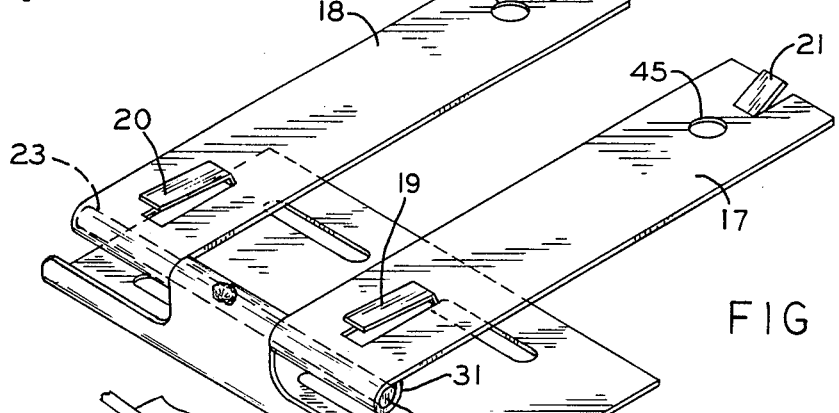
FIG. 2 is a perspective view of a motor mounting bracket for converting a standard motor mount to the boltless self-tightening arrangement of the present invention.

The hinged base, as best seen in FIG. 2, comprises two like pieces 17 and 18. Each piece is a sheet metal plate and has two locking tabs 19 and 21 for engaging elongated mounting holes such as 13 and 15 in a conventional motor base 11. The tabs such as 19 nearer the pivot are longer than the tabs such as 21 more remote from the pivot. A pin 23 fastens the hinged sheet metal plates 17 to a fixed bracket 25 for adaptation to conventional motor mountings. Pin 23 may be otherwise directly fixed to the driven device at the time of its manufacture and bracket 25 omitted. Pivotal motion of the motor 10, motor base 11 and plates 17 and 18 about pin 23 to tighten the belt is quite similar to that found in conventional alternator or generator mounts in automobiles, but tension on the V-belt 27 is maintained by gravity, not a clamping arrangement and no fasteners are required. It will be understood that, in some applications, a tension spring to the driven mount plate of an alternator or generator, or the drive mount plate of a motor, as examples, could be added to increase tension if desired and still require no bolts or tools for installation or removal.

Figure 3:
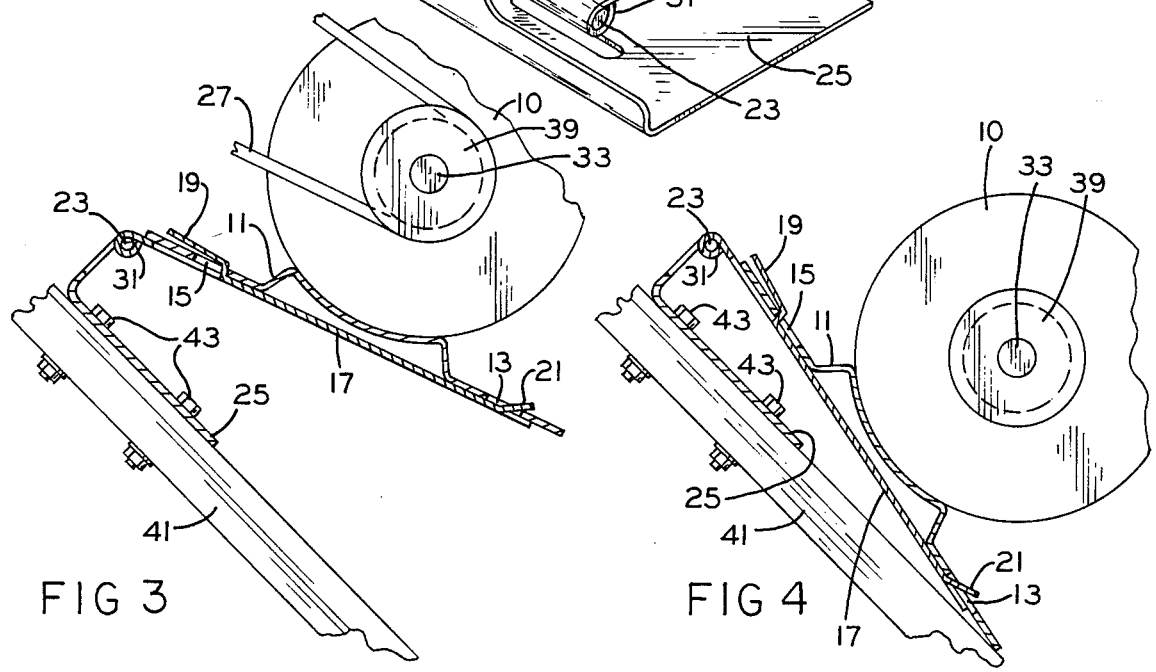
FIG. 3 is a side elevation view showing the bracket of FIG. 2 coupling a fragment of a motor to a section of the fan of FIG. 1.
Figure 4:
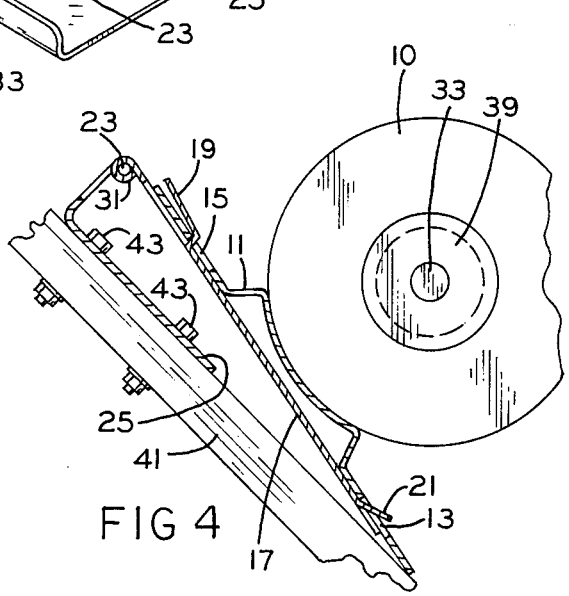
FIG. 4 is a side elevation view similar to FIG. 3 but with the support provided by the V-belt coupling removed.

When operating and suspended by the V-belt, the motor base 11 and hinged bases 17 and 18 assume the relative positions shown in FIGS. 1 and 3 with both tab (19 and 21) free ends overlapping their elongated apertures 15 and 13 respectively, while if the belt is removed or broken, the motor base slides down to the position of FIG. 4 with safety tab 19 preventing the motor from tipping off the bracket. The safety tabs such as 19 also prevent undesired tipping of the motor which might otherwise cause substantial misalignment between the v-belt and pulley.

In FIG. 2, each of the sheet metal plates 17 and 18 is formed from a flat planar sheet of metal for mounting the electric motor 10 on a device supported pivot pin 23 for powering the illustrative exhaust fan 29. Each plate has a hinge-like deformation 31 at one plate end for encircling the pivot pin 23 and the two cantilevered locking tabs such as 19 and 21 having their respective free ends extending in opposite directions and displaced from the sheet of metal. The locking tabs are formed by partially severing the plate to outline the tabs and then deforming the outlined tabs out of the plane of the plate. The locking tabs are elongated with the direction of elongation of the two tabs extending generally perpendicular to the pivotal axis defined by the hinge-like deformation 31 and pivot pin 23. Tab 19 is longer than the other tab 21 and the longer tab 19 is located closer to the hinge-like deformation 31 than the other tab 21. Comparing the several views of the drawing, it will be noted that the plates 17 and 18 are adapted to receive the motor 10 with the motor shaft 33 axis extending generally parallel to the pivot pin 23.

Referring now to FIG. 1, the article of equipment to which motor 10 is mounted in driving relation is shown as an exhaust fan 29 and includes a driven shaft 35 with the motor 10 coupled to the driven shaft by a flexible endless coupler such as V-belt 27 entrained about pulley 37 of the driven shaft 35 and pulley 39 of shaft 33 of the motor. The motor is pivotably supported so that the weight of the motor maintains the coupler taut a seen in FIGS. 1 and 3. In FIG. 3, the weight of the motor creates a clockwise moment of force about the axis of pin 23 which is opposed solely by the belt tension to maintain static equilibrium.

Conventional fastening of the motor to the exemplary exhaust fan would be by passing bolts through the elongated (in a direction perpendicular to the motor shaft axis) apertures such as 11 and 13 and through a portion of the fan assembly such as the brace 41. Belt tension would then be obtained by sliding the motor as allowed by the elongated holes before tightening the bolts. When the present invention is used for converting a conventional mounting scheme, the bracket 25 is permanently bolted to an existing mount such as the brace 41 as by bolts 43. Plates 17 and 18 are then slid onto the opposite ends of the pin 23. When the present invention is used in conjunction with the original manufacture of a device, pin 23 may be formed as an integral portion of the device and bracket 25 is not necessary. The plate 17 is substantially identical to the plate 18, the plates are laterally displaced from one another and are pivotably supported near one end by the loops such as 31 encircling pin 23 so as to pivot about an axis common to the plates. The cantilevered locking tabs 19, 20, 21 and 22 have their respective free ends extending pairwise in opposite directions, whereby the two plates may be juxtaposed with the motor base 11 with the tabs (19 or 20) closest to the pivot pin 23 extending through corresponding apertures (15) in the motor base, the motor and base laterally shifted relative to the plates and the other tab (21 and 22) passed through the other apertures (13). From FIGS. 3 and 4 it will be seen that the distance between a pair of opposed cantilevered locking tab free ends on a plate exceeds the maximum distance between the corresponding elongated apertures so that the motor is held in position on the plates 17 and 18 by the tabs 19 and 20 even when no belt is present (FIG. 4). When the belt 27 is entrained over the pulleys 37 and 39 as shown in FIG. 3, the motor slides upwardly along the plates 17 and 18 crowding the base 11 into the notches formed by the tabs 21 and 22 and in this position, a portion of tabs 19 and 20 still overhang the ends of apertures 11.

From the foregoing disclosure, those skilled in the art will devise many adaptations, modifications and uses for the present invention beyond those herein disclosed. For example, while the motor mounting arrangement is truly boltless, holes such as 45 and 47 may be provided in the plates 17 and 18 for the additional bolt fastening of a motor to the plates if desired for safety, unusual positioning of the motor or special applications. While described primarily as a motor mount, the mounting scheme may be utilized for fastening a wide variety of dynamoelectric machines or other rotating devices onto various fans, furnaces, machine tools or other utilization devices. Bracket 25 is not required when a utilization device is designed to include a pivot pin, wire, tab, slot or other pivotal support for plates 17 and 18. The plates could include hinge pins and the utilization device be provided with the hinge to receive those pins. While described as a circular pin in conjunction with a rolled plate hinge, the same pivotal results may be achieved by simple slots in a wall and a slot engaging tongue at one end of each of the plates 17 and 18. Wire, molded plastic or other materials may be used in forming the plates 17 and 18. A motor base could be made to include tabs like 19, 20, 21 and 22 and the plates 17 and 18 to include the tab receiving holes.

From the foregoing, it is now apparent that a novel arrangement for mounting a dynamoelectric machine or other rotating device has been disclosed meeting the objects and advantageous features set out hereinbefore as well as others, and that numerous modifications as to the precise shapes, configurations and details may be made by those having ordinary skill in the art without departing from the spirit of the invention or the scope thereof as set out by the claims which follow.

What is claimed is:

1. An arrangement for mounting an electric motor in driving relation with an article of equipment, the article of equipment including a driven shaft with the motor being coupled to the driven shaft by a flexible endless coupler entrained respectively about the driven shaft and a shaft of the motor, the arrangement comprising first and second generally flat plates, the first plate fixed to the device and the second plate supported near one end thereof by the article of equipment for pivotal motion about an axis, one of the plates including at least two elongated apertures and the other of the plates being generally planar and including at least two corresponding cantilevered locking tabs formed by partially severing said other plate to outline the tabs and deforming the outlined tabs away from said other plate, the locking tabs having their respective free ends extending in opposite directions generally perpendicular to the second plate pivot axis and displaced from the plane of said other plate, one tab being longer than the other tab with the one longer tab being located closer to the pivot axis than the other tab, and the distance between the cantilevered locking tab free ends exceeding the maximum distance between the corresponding elongated apertures whereby the two plates may be juxtaposed with one tab extending through one aperture, one plate laterally shifted relative to the other plate and the other tab passed through the other aperture and, thereafter, the motor is pivotably supported so that the weight of the motor maintains the coupler taut.

2. The arrangement of claim 1 wherein the first plate is said one plate and further comprising a third plate substantially identical to the second plate, laterally displaced from the second plate and pivotably supported near one end to pivot about an axis common to the second and third plates.

3. An arrangement for mounting a device in driving relation with an article of equipment comprising a flexible endless coupler, a generally planar sheet of metal fixed to the device and having a plurality of elongated apertures, a like plurality of mounting fingers supported on the article of equipment and extending obliquely relative to the plane of the sheet of metal and through corresponding elongated apertures, at least two fingers extending in directions opposite one another and having cantilevered free ends with the distance between the cantilevered free ends exceeding the maximum distance between their corresponding apertures, the device being movable in a limited range relative to the mounting fingers spanning a raised position with the flexible coupler drivingly entrained about both the device and the article of equipment, and a lowered position for facilitating removal of the device from the article of equipment.

4. The arrangement of claim 3 wherein there are four mounting fingers, the fingers being formed in pairs as portions of a pair of like plates for mounting the the device on an article of equipment supported pivot pin, each plate comprising a hinge-like deformation at one plate end for encircling the pivot pin with the mounting fingers formed as two cantilevered locking tabs having their respective free ends extending in opposite directions and displaced from the plate.

5. The arrangement of claim 4 wherein the locking tabs are formed by partially severing the plate to outline the tabs and deforming the outlined tabs out of the plane of the plate.

6. A sheet metal plate formed from a flat planar sheet of metal to be used as one of a pair of like plates for mounting a motor on a device supported pivot pin for powering the device comprising a hinge-like deformation at one plate end for encircling the pivot pin, the plate being adapted to receive a motor with the motor shaft axis extending generally parallel to the pivot pin, and two cantilevered locking tabs formed by partially severing the plate to outline the tabs and deforming the outlined tabs out of the plane of the plate, the tabs being elongated with the direction of elongation of the two tabs extending generally perpendicular to the pivot pin, one tab being longer than the other tab with the one longer tab being located closer to the hinge-like deformation than the other tab, the tabs having their respective free ends extending in opposite directions and displaced from the plane of the sheet of metal.

* * * * *